June 5, 1956 — J. W. TATTER — 2,748,856

FOLDABLE VEHICLE DOOR CONSTRUCTION

Filed Feb. 20, 1953

INVENTOR.
John W. Tatter
BY
Hauke + Hardesty.
Attorneys.

United States Patent Office 2,748,856
Patented June 5, 1956

2,748,856
FOLDABLE VEHICLE DOOR CONSTRUCTION

John W. Tatter, Akron, Ohio

Application February 20, 1953, Serial No. 337,925

7 Claims. (Cl. 160—210)

My invention relates to an automobile or vehicle door and more particularly to a two part door structure especially applicable for use with an automobile facilitating the opening of same in a restricted space or clearance with respect to an adjacent obstruction.

Everyone is more or less familiar with the difficulties experienced in entering or leaving an automobile when the clearance between the side of the vehicle and a garage wall or between adjacent parked cars is such as to interfere with the opening of the automobile door. In some vehicles, especially of the two-door sedan type, the door opening serves to provide access to both the front and/or rear compartments of the vehicle. In the case where adjacent obstructions interfere with the outward opening of the door, it is very often quite difficult if not impossible to enter or leave the vehicle under such circumstances, and in the case of the standard two door type, it is very often very difficult to enter or leave the front compartment, whereas it is, with the same amount of clearance, less difficult to enter or leave the front compartment of a four door vehicle. This results from the fact that the front vehicle seat is located well back of the rear edge of the door opening in a four door vehicle, while in a two door vehicle, the front seat is located forwardly of the rear edge of the door opening.

It is an object of the present invention to facilitate entering and leaving an automotive vehicle under circumstances where the opening of the door is limited, due to close proximity of the car or automobile with an adjacent parked car or automobile or a garage wall or the like, by constructing a door of a pair of hinged sections in which the rear section may be folded back onto the forward section whereby to greatly enlarge the door opening under such adverse conditions as enumerated above.

A further object of the present invention is to provide an improved car door for an automobile by constructing such door of hinged sections and providing locking means to lock said sections, permitting operable use of the door in the same manner as any standard door, but selectively unlocking said sections when desired to collapse said door to facilitate the occupant leaving or entering said vehicle, and by constructing an improved and novel common actuating means for the conventional door latch and said locking means.

For a more detailed understanding of my invention, reference may be had to the accompanying drawing illustrating a preferred embodiment of said invention, in which like parts are referred to by like numerals throughout the several views, and in which Fig. 1 is a side elevational view of an automobile vehicle provided with a door embodying my invention.

Figure 1:
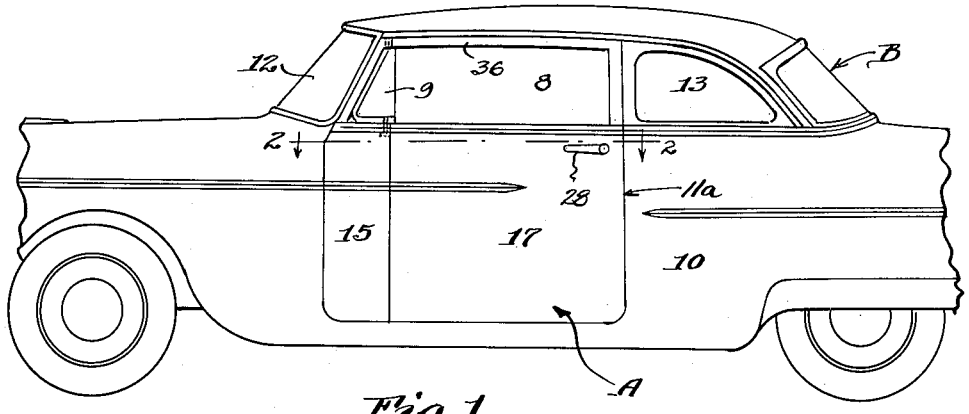

The present invention is particularly applicable for use in automobiles, especially that type of automotive vehicle generally referred to as the two-door sedan or coach. As herein illustrated, my improved and novel door, indicated as a whole by reference character "A" is incorporated with a two-door sedan vehicle "B" having a body 10, a door opening 11, a windshield 12 and a back or rear quarter window 13.

Figure 3:
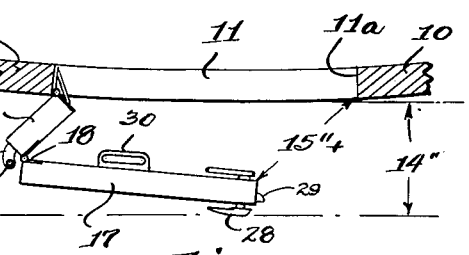
Fig. 3 is a fragmentary sectional view similar to Fig. 2, but showing the novel two part door in collapsed position.

The vehicle door "A" comprises a forward door section 15 hinged as at 16 along its front edge to the vehicle body to swing outwardly away from the body, and a rear door section 17 hinged as at 18 to the forward door section 15 to swing inwardly with respect to the forward door section (see Fig. 3).

Figure 2:
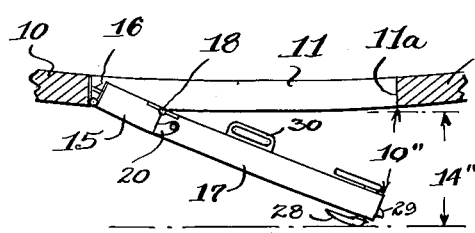
Fig. 2 is a fragmentary horizontal sectional view taken substantially on the line 2—2 of Fig. 1 and showing said door partially open.

These door sections 15 and 17 are normally locked together and held positioned in a common plane (see Fig. 2). When so locked, the two door sections operate as one, and function substantially as does a standard or regular door closure. The door section locking means comprises a bracket 20, two such brackets being preferably employed (see Figs. 4, 5 and 6) carried by the forward or front door section 15 and latches 21 carried by the rear door section and positioned so as to be moved into locking engagement with the brackets. More particularly, the brackets 20 are rigidly fastened to the front door section and project rearwardly from the rear or back edge of the front door section. These brackets are preferably constructed arcuate in plan (see Figs. 2 and 3) and are projected into the body of the rear door section, the ends of said brackets having holes 22 into which the ends of the latches 21 may be dropped to lock said door sections together and secure the same against being adjusted about the hinge 18. These latches, one for each bracket, are pivotally supported to the rear door section as at 23 and are interconnected by a link 24 so as to be moved in unison. One of these latches 21, preferably the upper one, is connected by link 25 to an ear 26 carried on the spindle 27 to which the door handle 28 is also secured or otherwise suitably fastened. This door handle operates the conventional door latch 29.

Figure 4:
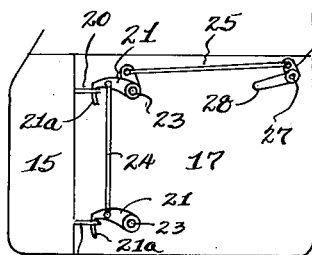
Fig. 4 is a fragmentary elevational view of the door section locking means, and showing the operating connection between said locking means and the connecting door latching means.
Figure 5:
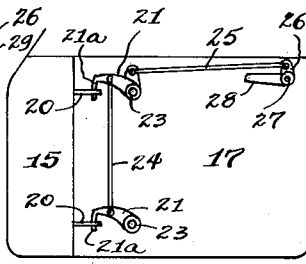
Fig. 5 is a similar fragmentary elevational view of the door section locking means showing same in an intermediate position.
Figure 6:
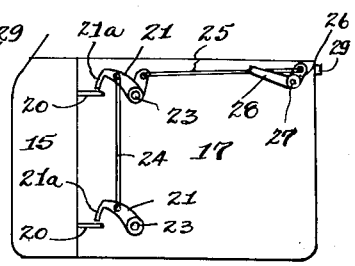
Fig. 6 is another fragmentary elevational view of the door section locking means showing same in an unlocked position.
Figure 7:
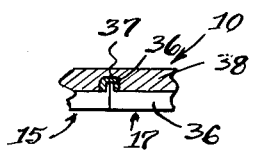
Fig. 7 is a fragmentary detailed sectional view of the locking device for the top of the door assembly and serving as an anti-rattling device.

The normal neutral position of the door handle 28 is shown in Fig. 5 and latch 29 is withdrawn to unlatch the door by simply pushing down on the door handle 28 (see Fig. 4), and it will be noted that in both positions, as illustrated in Figs. 4 and 5, the latch or lock between said door sections is secured. To release the latches 21 from the brackets 20, the door handle is pulled up (see Fig. 6) thus raising the latch fingers 21a of latches 21 out of the hole or socket 22.

Referring now to Figs. 2 and 3, it will be observed that these illustrations show how the effective open area may be increased when the opening of the door "A" is restricted. For example, the clearance between the side of the vehicle and an adjacent parked car or an adjacent wall or other obstruction may be, say about 14 inches. The door has considerable thickness of course, generally about two or three inches, and the door handle projects also from the outer surface of the door. Fig. 2 illustrates an effective door opening width of about 10 inches as had with a conventional door or with applicant's door when the front and rear sections are locked together.

By unlocking these door sections, the front door section may be swung wide and hinge 18 permits said door to be jack-knifed, or in other words, the rear door section is swung in a reverse direction to the travel of said front door section 15 about hinge 16 (see Fig. 3). The forward edge portion of the rear door section overlaps the front door section and is generally moved forwardly relative to the vehicle door opening, and the clearance or width of the effective door opening, measured from edge 11a of the door opening 11 to the rear edge of said rear door section is approximately about 15 inches or better. Thus the effective door opening has been increased about 50% over the normal opening.

To close the door from position of Fig. 3, one simply pulls back on the door handle and when sections 15 and 17 are moved into plane, the door handle is pushed down to the position shown in Fig. 5. From the inside, the door is pulled into plane and closed by pulling back and inwardly on the handle 30.

If desired, a locating pin or projection 35 may be carried by the upper frame 36 of the door at or near the break between the front and rear door sections, which pin is adapted to enter a rubber keeper 37 preferably sunk or otherwise suitably fixed into the frame 38 of the vehicle body. This more or less locates the top of the folding door structure and serves also as an anti-rattling device. It may be also noted that the adjustable ventilating window 9 may be conveniently carried by the front or forward door section 15 and the door window glass 8 is carried by the rear door section 17.

It will be apparent to those skilled in the art to which my invention pertains that various changes may be made herein without departing from the spirit of my invention or from the scope of the appended claims.

I claim:

1. An automotive vehicle door comprising a forward and rear section adapted to be normally positioned in a common plane, means hinging said door to a vehicle body, hinging said door sections to permit said door to jack-knife to move said sections out of said normal common plane, and means to lock said door sections against movement out of their normal common plane position, a door latch for securing the door in closed position with respect to the vehicle body, a door handle for actuating said door latch, and means connecting said door section locking means to said door latch actuating means whereby to permit actuation of said handle for selectively actuating both said door latch and said door section locking means.

2. An automotive vehicle door comprising a forward and rear section adapted to be normally positioned in a common plane, means hinging said door to a vehicle body, hinging said door sections to permit said door to jack-knife to move said sections out of said normal common plane, and means to lock said door sections against movement out of their normal common plane position, a door latching means comprising a latching mechanism including a movable door handle and spindle operable to actuate said door latching means, and means connecting said door section locking means to said latching mechanism, said connecting means constructed and arranged to unlock said door section locking means on movement of said door handle in a direction opposite to the direction of the motion for opening said door latching means.

3. In an automotive vehicle, an automobile door hinged to the vehicle and comprising a forward and a rear door section adapted to be positioned normally in a common plane, means hinging said forward door section to the vehicle permitting outward swinging movement of said door, and means hinging said rear door section to the forward door section and confined to swing out of the normal common plane of said door sections in a direction counter to the swinging movement of said forward door section relative to the vehicle, whereby to fold said rear door section back upon the forward door section and consequently displace said rear door section forwardly of the vehicle door opening resulting in an abnormal door opening on opening said vehicle door assembly, and means for locking said door sections together in the same common plane, latching means carried by said door to latch said door to the vehicle, and means interconnecting said door sections locking means with said latching means and including an actuator common to both.

4. In an automotive vehicle, an automobile door hinged to the vehicle and comprising a forward and a rear door section adapted to be positioned normally in a common plane, means hinging said forward door section to the vehicle permitting outward swinging movement of said door, and means hinging said rear door section to the forward door section and confined to swing out of the normal common plane of said door sections in a direction counter to the swinging movement of said forward door section relative to the vehicle, whereby to fold said rear door section back upon the forward door section and consequently displace said rear door section forwardly of the vehicle door opening resulting in an abnormal door opening on opening said vehicle door assembly, and means for locking said door sections together in the same common plane, latching means carried by said door to latch said door to the vehicle, and means interconnecting said door sections locking means with said latching means and including an actuator common to both, said actuator selectively operable to actuate either said latching means or said locking means.

5. In an automotive vehicle, an automobile door hinged to the vehicle and comprising a forward and a rear door section adapted to be positioned normally in a common plane, means hinging said forward door section to the vehicle permitting outward swinging movement of said door, and means hinging said rear door section to the forward door section and confined to swing out of the normal common plane of said door sections in a direction counter to the swinging movement of said forward door section back upon the forward door section and consequently displace said rear door section forwardly of the vehicle door opening resulting in an abnormal door opening on opening said vehicle door assembly, and means for locking said door sections together in the same common plane, latching means carried by said door to latch said door to the vehicle, and means interconnecting said door sections locking means with said latching means and including an actuator common to both, said actuator actuated in one direction to operate said latching means and in another direction to operate said locking means.

6. An automotive vehicle door structure comprising a forward and rear section hinged together and adapted to be normally positioned in a common plane, said hinged sections being so hinged together as to permit same to jack-knife and to move out of said common plane, one of said door sections having inner and outer panels laterally spaced to provide a compartment, said other door section having a keeper, latching means disposed in said compartment and detachably engaged with said keeper to lock said door sections in the common plane aforesaid, and actuating means for said door section latching means.

7. An automotive vehicle door comprising a forward and rear section adapted to be normally positioned in a common plane, means hinging said door to a vehicle body, hinging said door sections to permit said door to jack-knife to move said sections out of said normal common plane, and means to lock said door sections against movement out of their normal common plane position, a door latch for securing the door in closed position with respect to the vehicle body, a door handle for actuating said door latch, and means connecting said door section locking means to said door latch actuating means whereby to permit actuation of said handle for selectively actuating both said door latch and said door section locking means, one of said door sections having laterally spaced inner and outer door panels, and both said door latch and said door section locking means disposed between said spaced inner and outer panels of said door section.

References Cited in the file of this patent

UNITED STATES PATENTS

| | | |
|---|---|---|
| 1,439,621 | Evans | Dec. 19, 1922 |
| 2,180,507 | Christiansen et al. | Nov. 21, 1939 |
| 2,581,797 | Jordan | Jan. 8, 1952 |

FOREIGN PATENTS

| | | |
|---|---|---|
| 894,788 | France | Mar. 20, 1944 |